United States Patent
Kohne et al.

[11] Patent Number: 6,118,226
[45] Date of Patent: Sep. 12, 2000

[54] ELECTRODELESS NEON LIGHT MODULE FOR VEHICLE LIGHTING SYSTEMS

[75] Inventors: Robert L. Kohne, Noblesville; Jack D. Bodem, Jr., Kokomo, both of Ind.

[73] Assignee: Federal-Mogul World Wide, Inc., Southfield, Mich.

[21] Appl. No.: 09/127,240

[22] Filed: Jul. 31, 1998

[51] Int. Cl.[7] .................................................. B60Q 1/04
[52] U.S. Cl. ........................ 315/248; 315/82; 313/160; 362/265
[58] Field of Search ................... 315/248, 80, 82; 313/160, 161, 318.01; 362/226, 265, 263

[56] References Cited

U.S. PATENT DOCUMENTS

| | | |
|---|---|---|
| 3,860,854 | 1/1975 | Hollister . |
| 4,427,925 | 1/1984 | Proud et al. . |
| 4,451,765 | 5/1984 | Gray . |
| 4,754,199 | 6/1988 | Parker . |
| 4,890,042 | 12/1989 | Witting . |
| 4,959,584 | 9/1990 | Anderson ................................. 313/160 |
| 5,028,847 | 7/1991 | Greb et al. ............................... 315/248 |
| 5,051,663 | 9/1991 | Ury . |
| 5,065,075 | 11/1991 | Greb ........................................ 315/248 |
| 5,070,278 | 12/1991 | Symour et al. .......................... 315/248 |
| 5,072,157 | 12/1991 | Greb et al. . |
| 5,086,258 | 2/1992 | Muckeljohn . |
| 5,111,117 | 5/1992 | Greb et al. ............................... 315/248 |
| 5,157,306 | 10/1992 | Witting . |
| 5,334,913 | 8/1994 | Ury . |
| 5,336,971 | 8/1994 | Vermeuler . |
| 5,384,515 | 1/1995 | Head . |
| 5,412,280 | 5/1995 | Scott . |
| 5,438,235 | 8/1995 | Sommerer . |
| 5,621,266 | 4/1997 | Popov . |
| 5,621,275 | 4/1997 | Wei . |
| 5,654,610 | 8/1997 | Cassarly et al. ......................... 315/248 |
| 5,682,080 | 10/1997 | Dolan . |
| 5,694,000 | 12/1997 | Antonis . |
| 5,723,947 | 3/1998 | Popov . |
| 5,747,945 | 5/1998 | Ukegawa et al. ....................... 315/248 |
| 5,834,904 | 11/1998 | Waymouth .............................. 315/248 |
| 5,866,991 | 2/1999 | Farkas et al. ............................ 315/248 |
| 5,886,478 | 3/1999 | Smith et al. ............................. 315/248 |
| 5,897,196 | 4/1999 | Soskind et al. ........................... 362/61 |
| 5,905,344 | 5/1999 | Vrionis ..................................... 315/248 |

*Primary Examiner*—Don Wong
*Assistant Examiner*—Wilson Lee
*Attorney, Agent, or Firm*—Reising, Ethington, Barnes, Kisselle, Learman & McCulloch, P.C.

[57] ABSTRACT

A light assembly (10) for a vehicle includes a housing (12) having a light-transmissive cover (18) and an RF emission gas discharge light source (22) provided as a self-contained module mountable in the housing (12). The module (22) includes an envelope (24) filled with an RF excitable gas (27) and an RF induction coil (28). The envelope (24) and coil (28) are fixed in working relation to one another in a common base (40). The base (40) also supports an electrical connector (32) that leads to the coil (28) and that mates with a corresponding connector (34) leading from the vehicle power supply (38). The module (22) and housing (12) have mutually connectable mounting portions (48, 50) for mounting the module (22) on the housing (12).

20 Claims, 5 Drawing Sheets

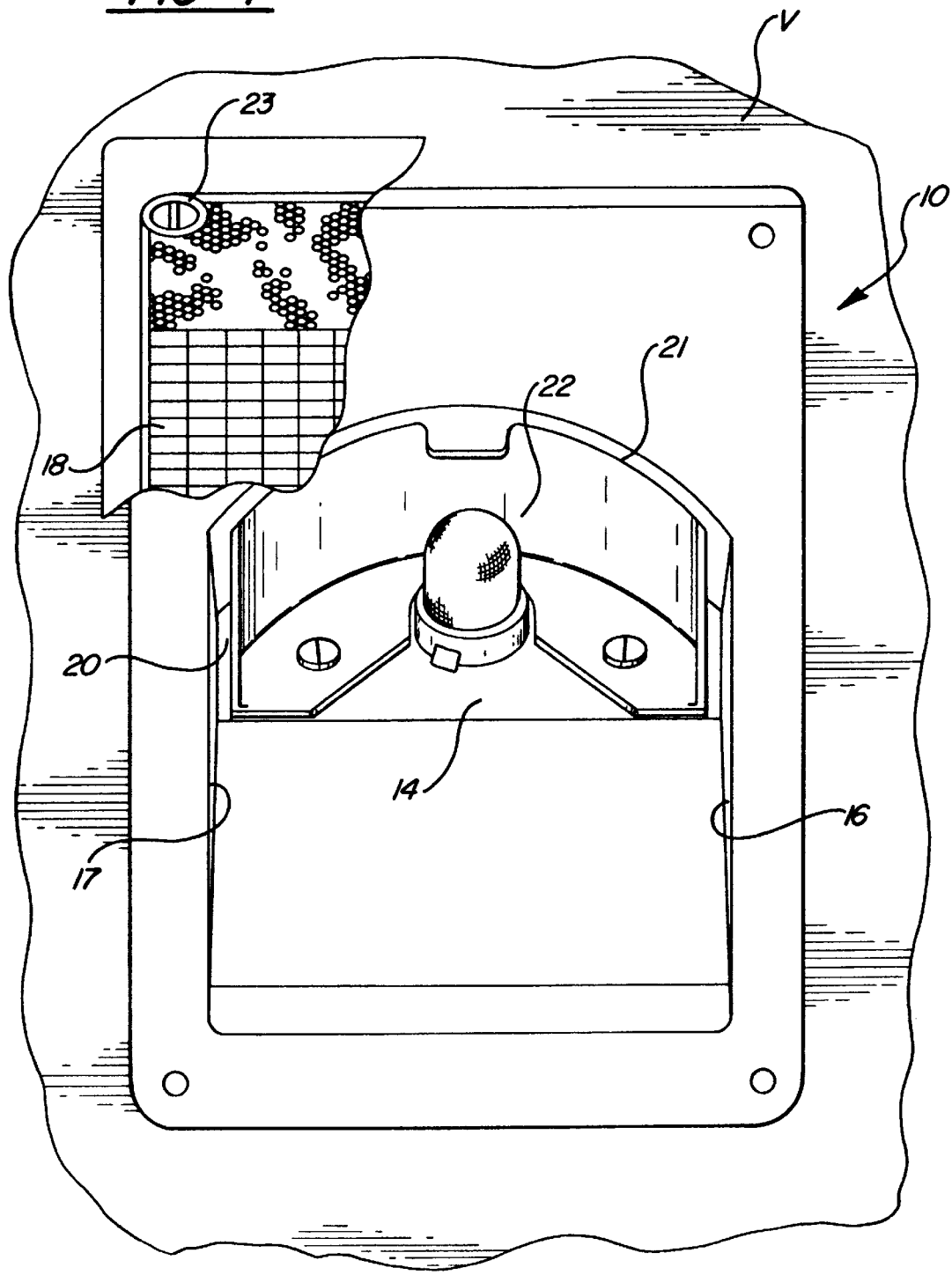

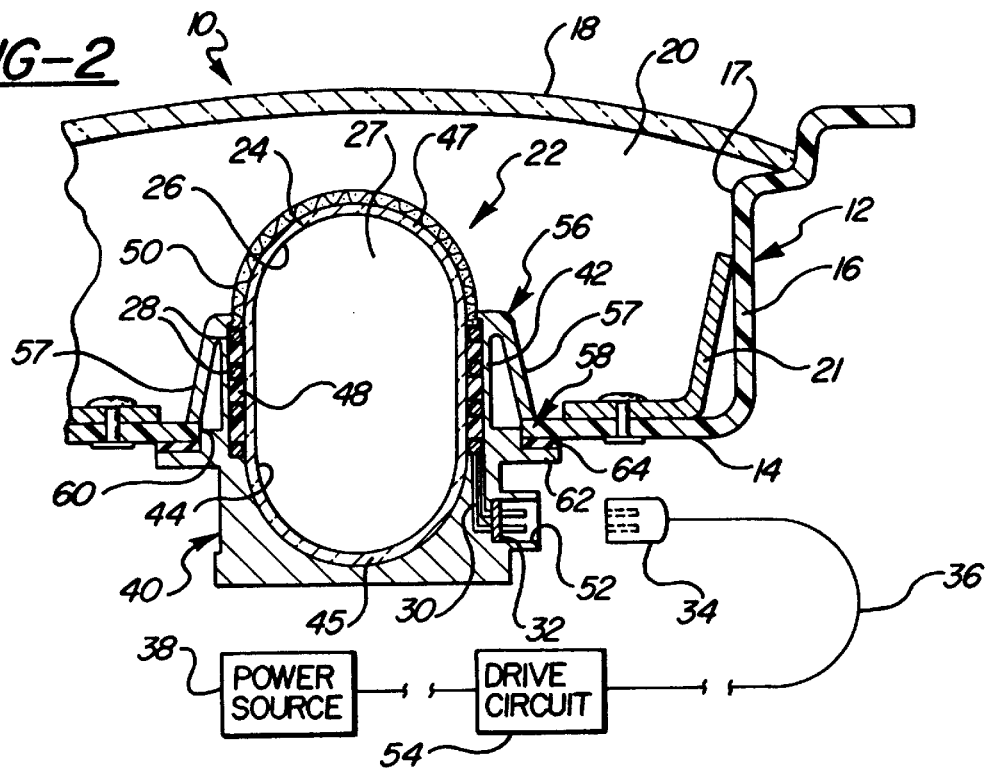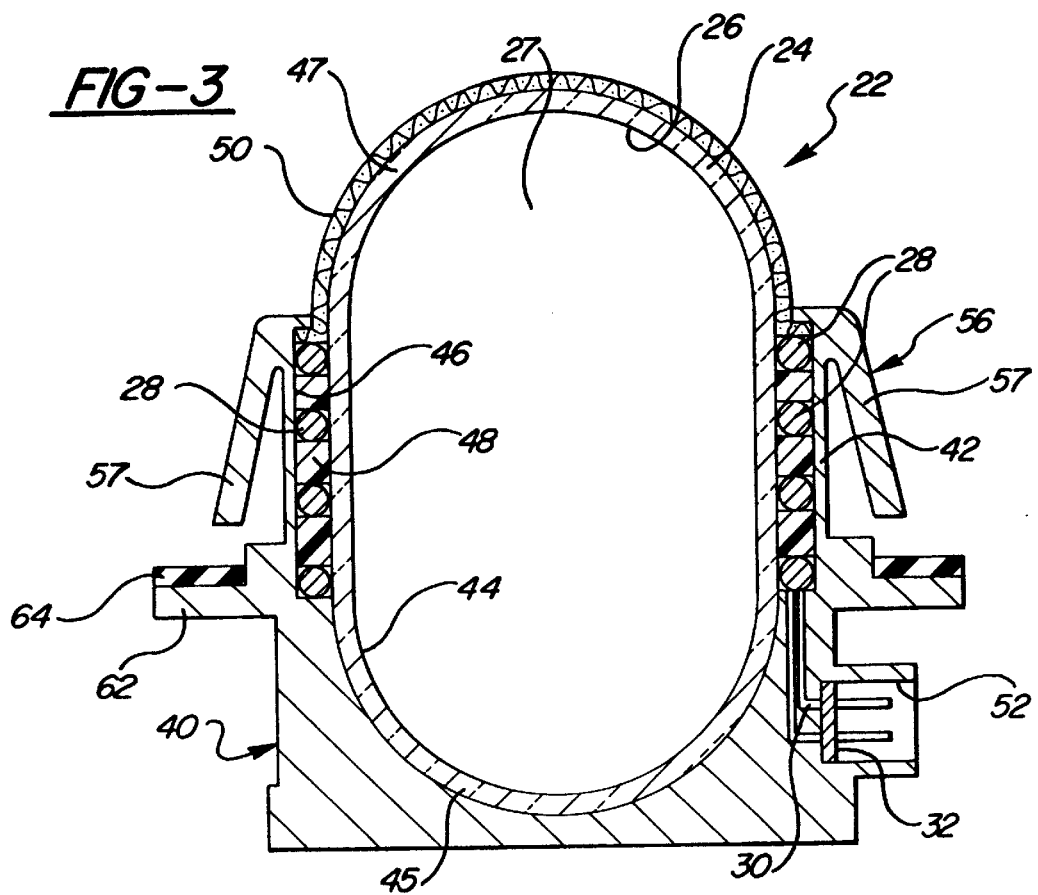

ELECTRODELESS NEON LIGHT MODULE FOR VEHICLE LIGHTING SYSTEMS

BACKGROUND OF THE INVENTION

1. Technical Field

This invention relates generally to vehicle lighting systems such as tail lights, signals, markers, emergency beacons and the like, and more particularly to such systems employing glow discharge gas as the illumination source.

2. Description of the Related Art

Incandescent bulbs are typically used in vehicle lighting systems, such as tail lights, signals, markers, and the like as the illumination source. The lamps contain a filament that glows white hot when sufficient current is passed through it. A major disadvantage of incandescent lighting is that the filaments are very fragile and short-lived and require periodic replacement to maintain the lights of the vehicle in working order. The problem of broken lamps is aggravated when the lamps are installed in vehicles which operate in abusive or rough terrain conditions, such as off-road vehicles, tractor/trailer rigs, construction and heavy equipment vehicles, etc.

Neon gas discharge lighting systems are known having an internal electrode contained within the sealed envelope of neon gas and driven by a high voltage ballast. The ballast operates to convert a relatively low voltage to high voltage sufficient to cause the electrode to arc and excite the gas to glow discharge. Such electrodes, however, are similarly fragile and prone to breakage and thus require periodic replacement. The ballast likewise has a limited service life and thus may also require periodic replacement. Moreover, the ballast draws considerably on the available power resource, which in the case of a vehicle are limited.

So-called "electrodeless" neon gas discharge lamps are generally known, wherein neon gas is sealed within an envelope and surrounded by an RF induction coil that, when energized, produces RF emissions that excite the neon gas to discharge illumination. See, for example, those disclosed in international published application Nos. PCT/GB97/00099 and PCT/GB97/01576. The fact that there is no internal drive electrode or filament makes an electrodeless neon gas discharge illumination source in principal an attractive candidate for vehicle lighting systems since they could be expected to last for the service life of the vehicle and would eliminate the need for costly replacement.

While it has been suggested to use electrodeless neon gas discharge lighting in vehicles and early prototypes have been made to demonstrate the concept, it is believed that the known prior developments, from a manufacturing and economic standpoint, would not be viable as a practical alternative to incandescent lighting. The known systems are cumbersome and departure in basic design from the current incandescent lighting systems wherein the incandescent lighting source is manufactures as a separate, self-contained unit apart from the light housing in which the light is installed. The early electrodeless gas discharge prototypes integrated the various components with the light housing structure such that the electrodeless light source was not separate and distinct from the light housing, but rather relied on the housing structure to support the components of the light source in working relation to one another.

Accordingly, it is not known in the prior art to provide a vehicle lighting assembly in which an electrodeless neon gas discharge source is constructed as a self-contained module or unit separate and distinct from the light housing, and it is believed that such would be a viable, practical alternative to present day incandescent lighting systems.

It is accordingly an object of the present invention to advance the art of vehicular lighting and electrodeless neon gas discharge lighting technology in a manner that makes such an alternative light source viable for vehicular lighting applications.

SUMMARY OF THE INVENTION AND ADVANTAGES

According to the invention, a vehicle light assembly is provided comprising a housing having a light-transmissive cover for closing the housing, and is characterized by a self-contained electrodeless gas discharge light source module, including a sealed envelope, an RF glow discharge gas sealed within said envelope, an RF induction coil external to the sealed envelope, and a base securing the envelope and RF induction coil in operative working relation to one another independently of the light housing.

The all-inclusive modular construction of the electrodeless gas discharge light source has several advantages over the known prior art vehicle lighting systems. The electrodeless design is far more robust and durable than conventional incandescent lamps and internal electrode neon lamps, and is particularly advantageous for use on vehicles operating in abusive or rough terrain conditions, such as off-road vehicles, construction vehicles, tractor/trailer rigs, and the like, which are particularly harsh on incandescent lights.

Another advantage of the invention is that the self-contained modular construction provides an alternative illumination source for vehicle light assemblies that advantageously could be implemented as a universal light source adaptable to all vehicle lighting systems which presently use incandescent lamps. In other words, based on a similar principle as the common incandescent light bulb, the module of the invention can be constructed with universal mounting features that cooperate with corresponding mounting features of vehicle light housings to enable a single module to be mounted in any of a number of different light housings via their compatible connecting portions.

The all-in-one modular aspect of the invention has the further advantage of providing a compact, miniaturized alternative light source that may be incorporated into the existing manufacture and assembly of vehicle light systems employing incandescent lamps. The light housing may still be fabricated as a separate component from the light source, but with connecting features for mounting the electrodeless neon gas discharge lamp module manufactured separately from the light housing as a self-contained unit and with connecting features compatible with those of the housing. The module may then be installed in the housing in a subsequent assembly operation, much like the installation of existing incandescent bulbs.

The module of the present invention has the further advantage over neon lamps with internal drive electrodes of eliminating the need for a high voltage ballast and thus the cost and maintenance associated therewith. Moreover, less power is required to operate the external induction coil via an electronic control circuit than is needed to drive the ballast, freeing up available electrical power for other uses.

BRIEF DESCRIPTION OF THE DRAWINGS

These and other advantages and features of the invention will be readily appreciated as the same becomes better understood by reference to the following detailed description when considered in connection with the accompanying drawings, wherein:

FIG. 1 is a perspective view of a vehicle light assembly constructed according to one presently preferred embodiment of the invention with a portion of the lens cover broken away;

FIG. 2 is an enlarged fragmentary sectional view of the light assembly of FIG. 1;

FIG. 3 is a further enlarged sectional view of the electrodeless gas discharge light module of the invention having an integrated electronics circuit;

DETAILED DESCRIPTION OF THE PREFERRED EMBODIMENTS

Figure 4:
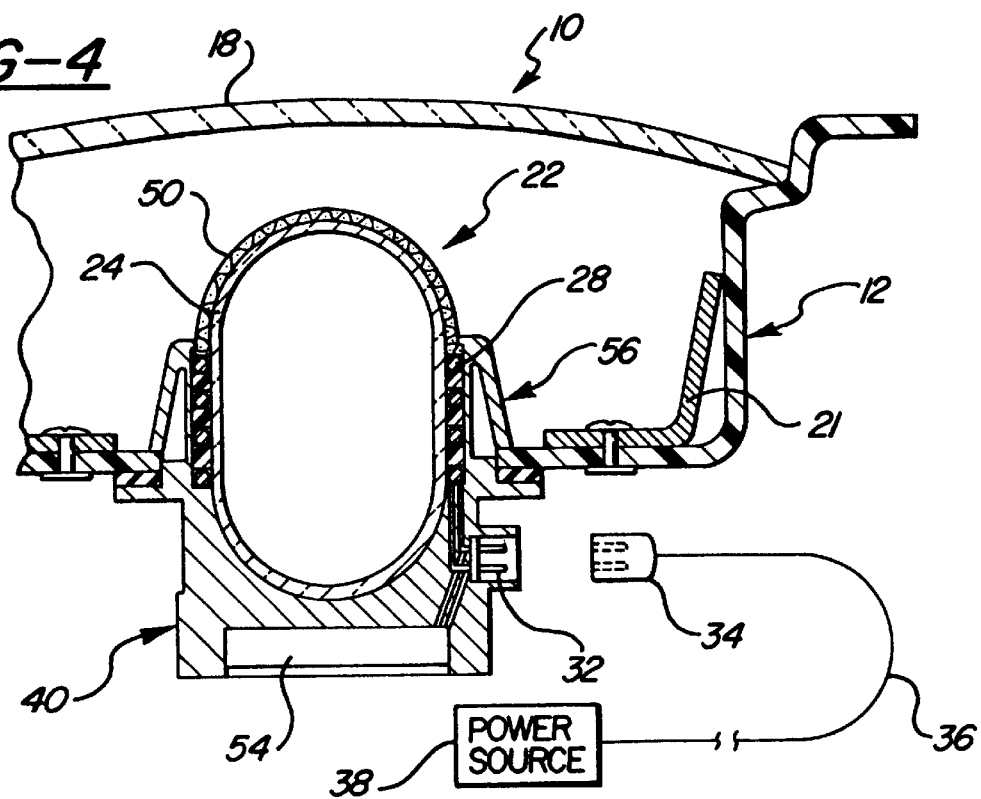
FIG. 4 is a view like FIG. 2 but of a module having an external electronics circuit.

A vehicle light system or assembly constructed according to a first embodiment of the invention is shown generally at 10 in FIGS. 1–4. The lighting assembly 10 may be employed on a vehicle wherever incandescent lighting systems are presently used. Examples include, but are not limited to, tail lights, brake lights, turn signals, markers, overhead auxiliary brake lights, emergency beacons, and the like as commonly found on automobiles, trucks, trailers, tractor/trailer rigs, heavy equipment, and the like. However, those skilled in the art will readily appreciate and understand that the features of the subject invention can be applied to other industrial, commercial, and household uses.

The light assembly 10 includes a housing 12 fabricated of an opaque, light-blocking material such as plastic or metal, and including a back wall 14, a side wall 16 extending from the back wall 14 toward an open end 17, and a light transmissive cover or lens 18 fabricated of clear or colored glass or plastics material according to conventional practice secured to the housing 12 and closing the open end 17. The housing 12 and lens 18 together define an enclosed space or cavity 20 within the housing 12. The housing 12 may further include a reflector 21 fixed to the back wall 14 of the housing 12 for directing light toward the lens 18. The housing also includes suitable mounting hardware, such as screw fasteners 23, for mounting the light assembly 10 on a vehicle V.

As shown best in FIGS. 2 and 3, a self-contained miniaturized electrodeless RF gas discharge light module 22 is mounted on the housing 12 and extends into the cavity 20 to serve as the illumination source of the assembly 10. The module 22 is constructed as an all-inclusive package that is ready-made to install in the housing 12 in similar manner to that of a conventional incandescent lamp. As shown best in FIG. 3, the module 22 includes a sealed envelope or bulb 24 fabricated of a material that is at least partly light-transmissive (e.g., glass). The envelope 24 encloses a space 26 in which an RF emission excitable gas 27 is contained. The gas 27 predominantly comprises neon and/or xenon. The gas composition is preferably substantially free of mercury.

The module 22 includes a metallic RF induction coil 28 that is external to the envelope 24 and preferably surrounds the envelope 24 in such working relation as to induce the glow discharge of the gas within the envelope 24 when the coil 28 is energized with RF power. An electrical lead 30 is operatively coupled to the coil 28 and terminates in an electrical connector 32 configured for mating connection with an associated electrical connector 34 of the vehicle V. The connector 34 has an electrical lead 36 operatively coupling the connector 34 to an electric power supply 38 of the vehicle V (e.g., typically the 12 volt power supply of the vehicle).

The module 22 is provided with a unifying base 40 that supports the envelope 24 and RF conduction coil 28 in operative working relation and further supports the electrical lead 30 and the associated connector 32 independently of the light housing 14. In other words, the working components of the module 22, including the envelope 24, coil 28 in the associated electrical lead 30, and connector 32 are all supported by the base 40 to provide a self-contained light source provided as a separate, all inclusive package apart from the light housing 12 and which can be supplied as a pre-manufactured component attachable to the housing 12.

It is preferred that the envelope 24 and coil 28 be permanently fixed in their working operative relation in the base 40 such that the envelope 24, coil 28, and base 40 form a single, one piece inseparable unit. The envelope 24 may be mechanically secured to the base 40 or secured by a suitable adhesive. The coil 28 may likewise be secured directly to the base 24 either mechanically or by an adhesive or secured to the envelope 24 either mechanically or adhesively. Another option for supporting the coil 28 in relation to the envelope 24 is to print the coil 28 onto the envelope 24, as by silk-screen or the like.

In the illustrated embodiment of FIGS. 1–4, the base 40 is formed with a cylindrical collar 42 defining a pocket 44 in which one end 45 of the envelope 24 is disposed with the opposite end 47 extending from the base 40. An annular recess 46 is formed on the inner wall of the collar 42 and is of sufficient length and depth to receive the coil 28. An adhesive 48 fills the recess 46 and permanently secures or bonds the envelope 24 and coil 28 to the base 40 in their operative working relationship.

The module 22 further includes an RF emission shield 50 fixed to the base 40 and covering the exposed portion 47 of the envelope 24 projecting beyond the base 40. The RF shield 50 preferably comprises a porous RF insulator such as metal screening which may be preformed to a dome shape and positioned over the envelope 24 as a protective cap. The shield 50 may be secured to the base 40 either mechanically and/or by means of a suitable adhesive. In the illustrated embodiment, the shield 50 extends into the recess 46 of the collar 42 and is secured to the base 40 by the adhesive 48. The RF shield 50 serves to block the emission of RF signals generated by the coil 28 for inducing the glow discharge of the gas 27 from escaping the module 22 through the exposed portion 47 of the envelope 24.

The base 40 is also preferably fabricated of an RF insulating material, such as a plastics material plated with copper, nickel, and/or chromium, or fabricated of ferrous metal. The RF material of the base 40 extends to those areas of the module 22 not protected by the RF shield 50, such that together, the base 40 and shield 50 prevent RF emissions from escaping the module 22.

As illustrated best in FIGS. 2 and 3, the electrical connector associated with the coil 28 is preferably integrated with the base 40 so as to be supported by the module 22 separately from the light housing 12. The connector 32 may comprise a slide-in female-type connection formed in part by a socket portion 52 of the base 40 for connection with an associated male connector 34 of the electric power supply 38 of the vehicle V in which the light assembly 12 is installed.

The term "electrodeless" means that the source for exciting the gas 27 within the envelope 24 is other than an electrode operated by a high voltage ballast. Such electrode-operated systems deliver high voltage power from the ballast to the electrode sufficient to cause it to arc and excite the gas to glow emission. By contrast, the electrodeless system of the invention employs the external RF induction coil 28 which, instead of arcing, emits RF signals that act on and excite the gas 27 to glow emission. The coil 28 is far more durable and robust than is an internal electrode and, consequently, the electrodeless light assembly 12 of the invention has an expected service life comparable to that of the vehicle in which it is installed (typically 100,000 miles, in the case of an automotive passenger vehicles). The light assemblies 12 are also contemplated for use on other than passenger vehicles, such as semi-tractor/trailer rigs and heavy construction/industrial vehicles which, in many cases, are subjected to rough operating conditions that typically short en the life of conventional incandescent lamps and other illumination sources employing an internal, fragile electrode (i.e., the electrode-based neon light system described above). The external RF induction coil 28 of the electrodeless module 22 of the invention is able to withstand such operating conditions and thereby greatly minimize or altogether eliminate the need for maintenance.

The RF coil 28 is coupled to an electronic RF-generating drive circuit 54 arranged in line between the coil 28 and the electric power supply 38 of the vehicle V. Such circuits for generating RF emissions in a coil of an electrodeless neon discharge lamp are generally known to the art as disclosed, for example, in PCT published applications 97/26705 and 97/48122 incorporated herein by reference. In the embodiment of FIGS. 1–3, the RF drive circuit 54 is provided as a separate external component apart from the module 22. The external circuit 54 is coupled to the coil 28 by means of the electrical connector 32 of the module 22 and the mating connector 34 which, in this embodiment, leads from the drive circuit 46. The invention contemplates, however, incorporating the RF drive circuit 54 as an integral part of the module 22. Such an arrangement is illustrated in FIG. 4, wherein the circuit 54 is supported by the base 40 as part of the module 22 in line between the coil 28 and connector 32. The connector 32 in this embodiment couples the circuit 54 to the electric power supply 38 of the vehicle V. The module of FIG. 4 is otherwise the same as that of the module of FIGS. 1–3.

The module 22 further includes mounting features or portions 56 cooperating with associated mounting features or portions 58 provided on the housing 12 for connecting the module 22 to the housing 12. Any of a number of known mounting connections in the vehicle lighting art may be employed including, but not limited to, snap-in, twist-in, screw-in, press fit, O-ring, and spring clip connections and the like.

FIGS. 1–4 illustrate a snap-in type connection between the module 22 and the housing 12, wherein the base 40 of the module 22 is formed with a pair of elastically flexible spring arms 57 and the housing 12 is formed with an associated opening 60. The arms 57 flex inwardly to allow the arms 57 to pass through the opening 60 from the backside of the housing and upon exiting the opening, the arms return outwardly and engage the inside surface of the housing 12 adjacent the opening 60 to retain the module 22 against removal. The base 40 includes a radially enlarged shoulder 62 spaced from the spring arms 57 and an elastically compressible washer 64 formed of foamed plastics, rubber, neoprene or the like supported by the shoulder 62 for engaging the opposite side of the housing and providing a fluid-tight seal between the housing 12 and module 22.

Figure 5:
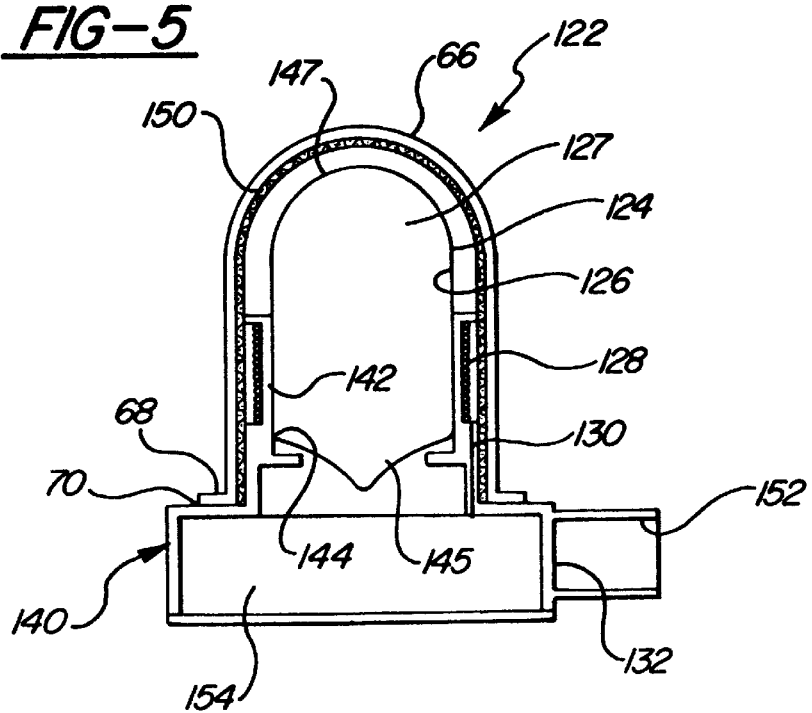
FIG. 5 is an enlarged sectional view of a module constructed according to a first alternative embodiment of the invention.

FIG. 5 shows another embodiment of an electrodeless RF glow emission module 122 constructed according to the invention, wherein like reference numerals are used to designate like features but are offset by 100. The module 122 includes a sealed envelope 124 fixed in the base 140 such as by an adhesive, and an RF induction coil 128 supported by the base 140 in encircling relation with the envelope 124. In this embodiment, the collar region 142 of the base 140 is RF transmissive in order to permit the coil 128 to transmit the RF signals through the intervening collar 142 to excite the gas 127 contained within the envelope 124. The module 122 includes the electrical connector 132 of the same type as previously described and an integrated electronic drive circuit 154 supported by the base 140.

The module 122 further includes a dome 66 fabricated of light-transmissive material such as clear plastics material encompassing the envelope 124 and coil 128 and secured at an open lower end 68 thereof to a shoulder 70 of the base 140 by means of a suitable adhesive or the like. An RF emission shield 150 is housed within the dome 66 and is preferably coextensive therewith to contain RF emissions within the dome 66. The shield 150 may be of the same porous metal construction as that of the shield 50 of the first embodiment. The remainder of the base 140 not covered by the shield 150 is preferably RF insulated as before to fully contain RF emissions within the module 122.

Figure 6:
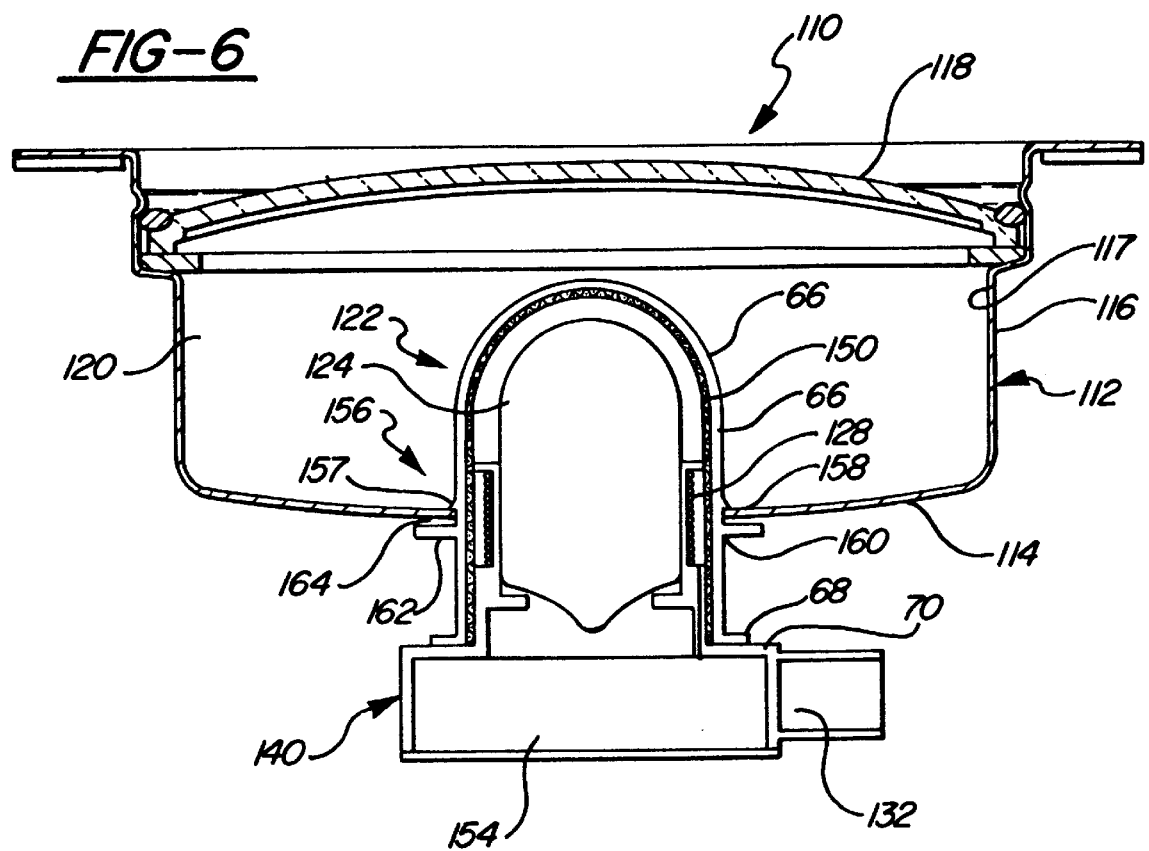
FIG. 6 is an enlarged sectional view of a second alternative lighting assembly according to the invention.

As illustrated in FIG. 6, the module 122 of FIG. 5 may be fitted with suitable mounting portions 156 for attaching the module 122 to the housing 112 of a light assembly 110. In this embodiment, however, the mounting portions 156 are provided on the dome 66 rather than the base 140. The operation and mounting of the module 122 is otherwise the same. FIG. 6 shows, for example, the module 122 provided with a similar snap-in type connection including spring arms 157, a retaining shoulder 162 and a compressible washer 164 that cooperate with an opening 160 in the housing 112.

Figure 7:
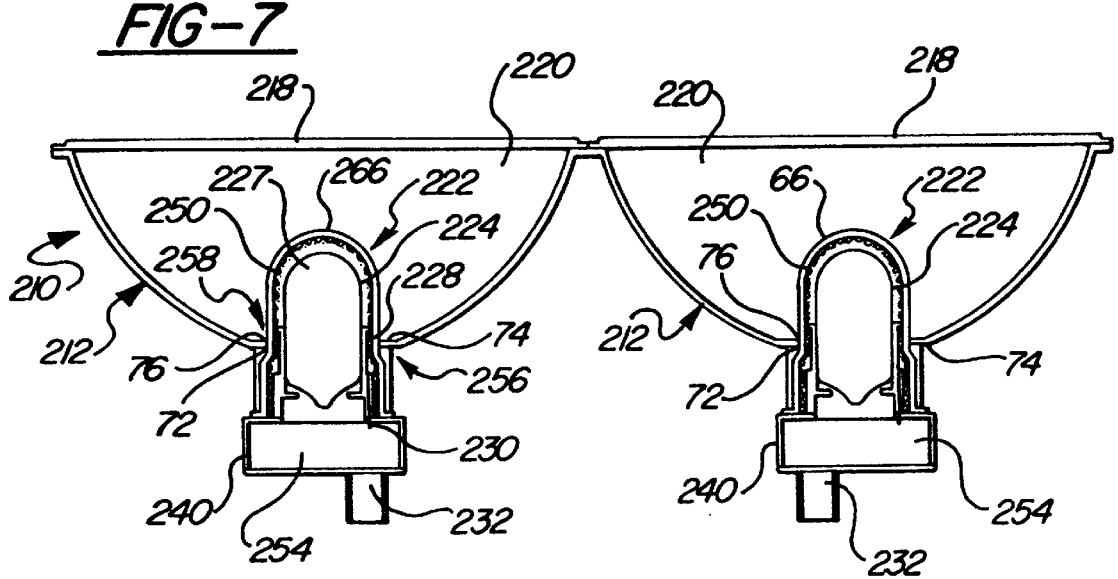
FIG. 7 is a third alternative embodiment of a lighting assembly according to the invention.

FIG. 7 shows still another embodiment of the invention wherein the same reference numerals are used to designate like feature but are offset by 200. The light assembly 210 of FIG. 7 includes multiple housings 212 (two shown) and multiple modules 222 installed in the housings 212. The modules 222 of FIG. 7 are the same as those of FIGS. 5 and 6 except that the modules 222 are provided with O-ring type mounting portion connections 256 rather than the snap-in connections described previously. The dome 266 and housing 212 are formed with opposing annular O-ring grooves 72, 74 in which an O-ring 76 is disposed. Interference between the O-ring 76 and the grooves 72, 74 operates to secure the modules 222 connected to their respective housings 212.

Figure 8:
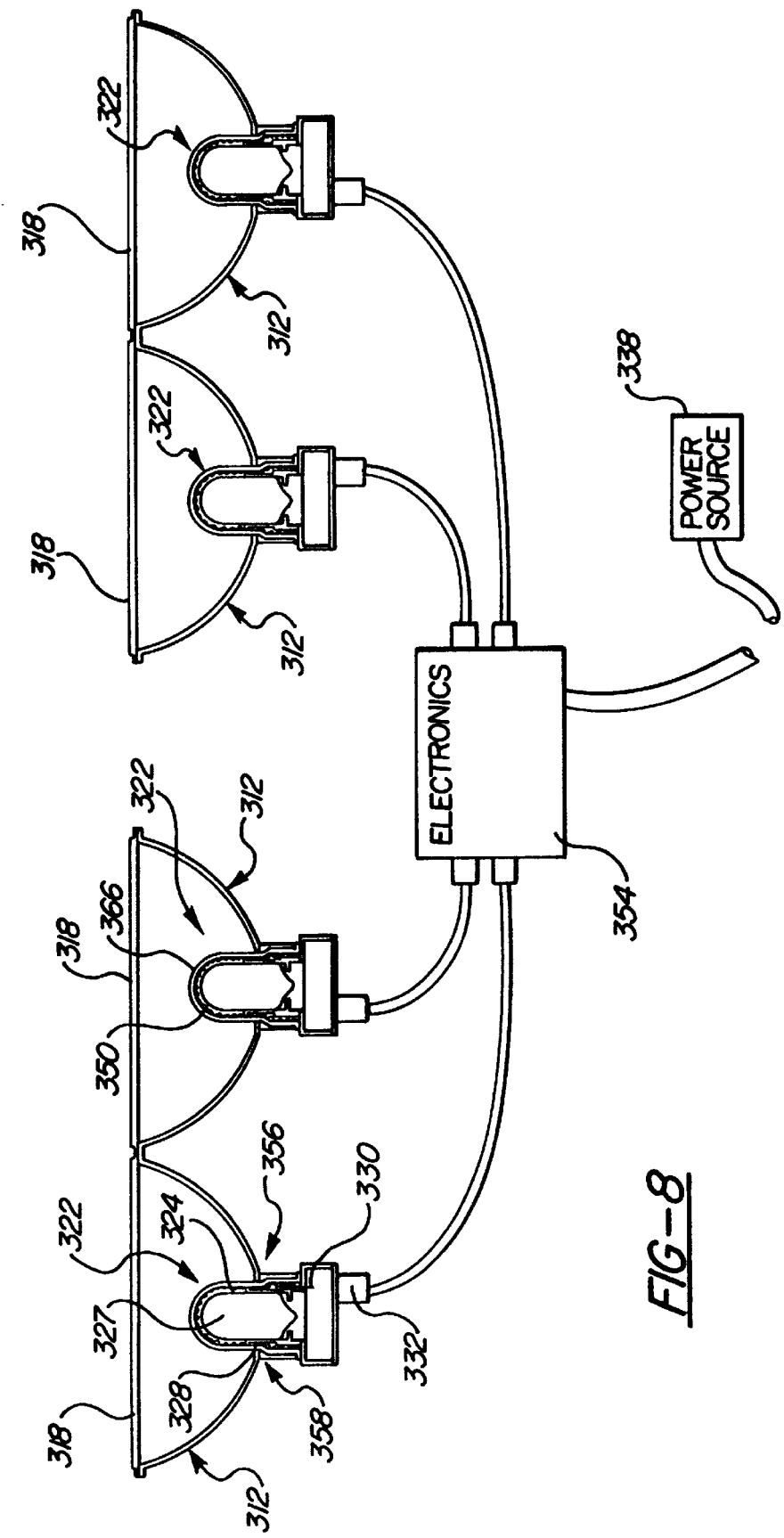
FIG. 8 is a fourth alternative embodiment of a lighting assembly according to the invention.

FIG. 8 shows still a further embodiment of the invention wherein like reference numerals are used to designate like feature but are offset by 300. The light assembly 310 of FIG. 8 includes multiple housings 312 (four shown) and multiple modules 322 like that of the embodiment of FIG. 7. However, the modules 322 of this embodiment lack the individual integrated electronic drive circuits 254 associated with each of the FIG. 7 modules 222. Instead, the modules 322 of FIG. 8 share a common external electronic drive circuit 354 associated with all of the modules 322. The modules 322 are otherwise the same as the modules of the FIG. 7 embodiment.

In each of the above embodiments, the module or modules are constructed to be about the same size or slightly larger than a conventional vehicular incandescent lamp so as to enable them to be installed in conventional light housing without requiring significant modification to the size or design of the housings. The modules are thus preferably constructed to have an overall length of about 2.5 inches or less and a diameter of about 1.5 inches or less.

Obviously, many modifications and variations of the present invention are possible in light of the above teachings. It is, therefore, to be understood that within the scope of the appended claims wherein parenthetical reference numerals are merely for convenience and are not in any way to be limiting, the invention may be practiced as otherwise than as specifically described.

What is claimed:

1. A vehicle light assembly comprising:
   a light housing having a light-transmissive cover for closing said housing; and
   a self-contained electrodeless gas discharge light source module including a sealed envelope that is at least partly light transmissive, an excitable gas sealed within said envelope, an RF induction coil external to said sealed envelope, and a base supporting said sealed envelope and said RF induction coil in operative relation to one another independently of said housing, with said module being mounted to said housing by said base such that said envelope and said induction coil are mounted on said housing via said base.

2. The assembly of claim 1 further characterized by said base supporting said RF induction coil in surrounding relation to said envelope.

3. The assembly of claim 2 further characterized by said envelope and said RF induction coil being inseparable from said base.

4. The assembly of claim 1 further characterized by said base including a mounting portion attachable to said housing.

5. The assembly of claim 1 further characterized by said housing and said base including cooperating mounting portions that, when engaged, connect said module to said housing.

6. The assembly of claim 1 further characterized by said gas comprising primarily at least one gas selected from the group consisting of neon and xenon.

7. The assembly of claim 1 further characterized by said module including an electrical connector supported by said base and operatively coupled to said RF induction coil.

8. The assembly of claim 1 further characterized by a portion of said envelope being exposed by said base and said module including an RF emission shield supported on said base independently of said housing in covering relation to said exposed portion of said envelope.

9. The assembly of claim 1 further characterized by said assembly including a plurality of said housings and a corresponding plurality of said modules mounted on said housings.

10. The assembly of claim 9 further characterized by said assembly including an RF generating electronic circuit coupled to said induction coil.

11. The assembly of claim 10 further characterized by said circuit being supported by said base.

12. The assembly of claim 10 further characterized by said circuit being external to said base.

13. The assembly of claim 12 further characterized by said assembly including a plurality of said housings and a plurality of said modules and wherein said circuit is external to said modules and operatively coupled to at least two of said modules.

14. The assembly of claim 1 further characterized by said module and said housing having mutually connectable mounting portions.

15. The assembly of claim 1 further characterized by said module having a predetermined overall length measuring about 2.5 inches or less.

16. An integrated electrodeless gas discharge lighting module for use with a light housing having a connecting portion for mounting of the lighting module on the housing, said lighting module comprising a sealed envelope that is at least partly light transmissive, an excitable gas sealed within said envelope, an RF induction coil external to said sealed envelope, an electrical power transmission connector associated with said RF induction coil, and a base mounting said electrical power transmission connector and supporting said sealed envelope and said RF induction coil in operative working relation to one another with said RF induction coil surrounding said envelope, said base including a connecting portion that is mutually engagable with the connecting portion of the light light housing, whereby said envelope, induction coil, and connector can be mounted on the light housing by connecting said base to the housing via said connecting portions.

17. A method of manufacturing a vehicle lighting system having an electrodeless gas discharge illumination source, comprising:
   preparing a housing having a light-transmissive cover closing the housing and including a mounting portion for mounting an illumination source within the housing;
   preparing a sealed envelope that is at least partially light transmissive and that contains an excitable gas;
   disposing an RF induction coil in operative working relation to the envelope;
   supporting the coil and envelope in a common base formed separately from the housing to provide a self-contained illumination module;
   providing mounting portions on the module connectable with the mounting portion of the housing; and
   assembling the module with the housing by connecting their mounting portions such that the induction coil and envelope are mounted on the housing via the common base.

18. The method of claim 17 further characterized by integrating an electrical connector into the base of the module associated with the RF induction coil.

19. The method of claim 17 further characterized by integrating an electrical drive circuit into the base of the module coupled electrically with the RF induction coil.

20. The method of claim 17 further characterized by constructing and arranging the components of the module in such manner as to limit the overall length of the module to about 2.5 inches or less and a width of about 1.5 inches or less.

* * * * *